July 4, 1961  C. S. STEADMAN  2,990,927
VEHICLE TRANSMISSION SYSTEMS
Filed Feb. 16, 1959  2 Sheets-Sheet 1

C.S. Steadman
Inventor

July 4, 1961 C. S. STEADMAN 2,990,927
VEHICLE TRANSMISSION SYSTEMS
Filed Feb. 16, 1959 2 Sheets-Sheet 2
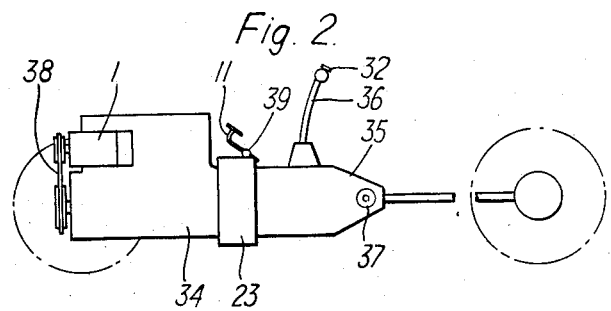
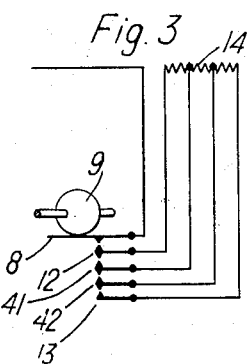
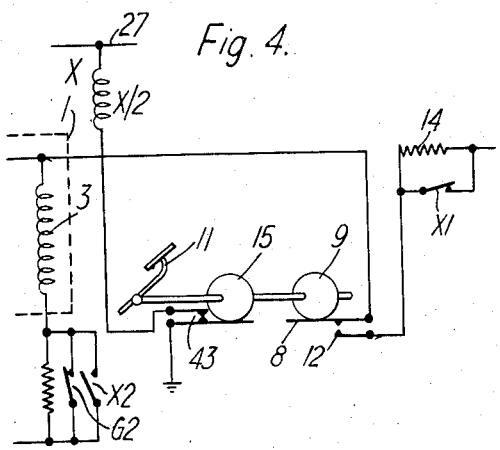
C. S. STEADMAN
Inventor United States Patent Office 2,990,927
Patented July 4, 1961

2,990,927
VEHICLE TRANSMISSION SYSTEMS
Clifford Stuart Steadman, Boars Hill, near Oxford, England, assignor to Smiths America Corporation, Washington, D.C.
Filed Feb. 16, 1959, Ser. No. 793,466
Claims priority, application Great Britain Feb. 21, 1958
13 Claims. (Cl. 192—.076)

The present invention relates to power transmissions for vehicles having an engine controlled by a throttle or equivalent device (referred to hereinafter as a throttle) of the kind which include a clutch controlled by an electrically-energised winding in the drive from the engine to the wheels.

It has been proposed in the past to control the energisation of the clutch in accordance with throttle position, by means for example of a variable resistor. This is satisfactory so long as the throttle is opened comparatively gently, but if the throttle is opened fairly wide when starting from rest suddenly the engine torque will not build up sufficiently rapidly to match the clutch torque, so the engine may be stalled, or at least the vehicle start in a jerky fashion.

It has also been proposed to energise the clutch directly from the output of the usual battery-charging generator, the generator circuit being modified under starting conditions by the insertion of a resistor in series with the field winding to over-ride the action of the usual regulator, and give a generator output voltage varying with engine speed in such a manner that the clutch torque and engine torque are matched. In unfavourable circumstances, however, for example when a substantial part of the vehicle's running time is spent under starting conditions, the battery may not be adequately charged.

It is accordingly the object of the present invention to provide a power transmission of the kind referred to in which the disadvantages of both the above-mentioned earlier systems are avoided.

According to the present invention I provide a power transmission system for a motor vehicle comprising an electrically energised clutch, a generator driven by the engine of the vehicle and having an armature and a field winding, the armature voltage being dependent upon engine speed and current in the field winding, first variable resistance means connected between the armature and the clutch, second variable resistance means connected in series with the field winding, an engine throttle control member movable between a throttle-closed position and a throttle-open position, and operatively connected to the first and second variable resistance means, the first variable resistance means being varied from a maximum to a minimum value over a first opening range of movement of the control member from the throttle-closed position, and the second variable resistance means being varied from a minimum to a maximum value upon opening movement of the control member beyond the first range.

A power transmission system in accordance with the present invention and suitable for use in a conventional vehicle driven by an internal combustion engine through a conventional, manually-controlled, gear box will now be described with reference to the accompanying drawings, of which:

FIGURE 2 shows components of the system mounted on a vehicle chassis,

FIGURE 3 is a modification of the circuit of FIGURE 1, and

FIGURE 4 is a further modification of the circuit of FIGURE 1.

Figure 1:
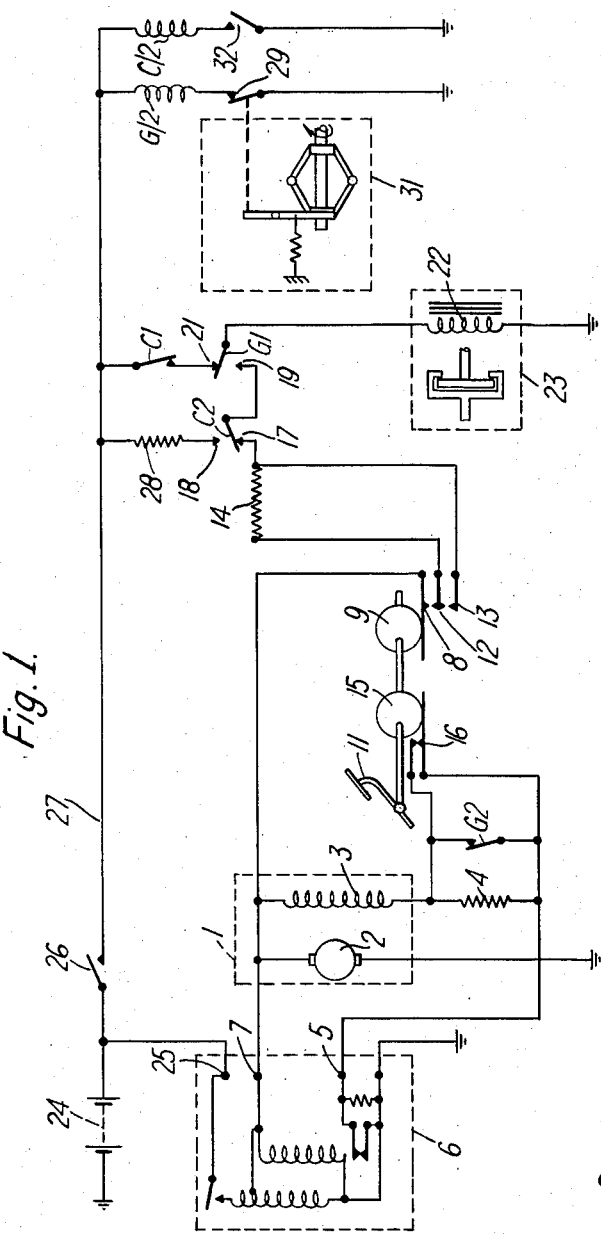
FIGURE 1 is an electrical circuit diagram of the system.

There is indicated at 1 the usual electric generator driven by the engine and having an armature 2 and field winding 3. The negative terminal of the armature is earthed to the chassis. The positive terminal is connected to one terminal of the field winding 3 whose other terminal is connected through a resistor 4 to the field terminal 5 of a conventional voltage regulator and cut-out indicated at 6. The positive armature terminal is also connected to the armature terminal 7 of regulator and cut-out 6. Additionally the positive armature terminal is connected to a contact 8 engaged by a cam 9 positioned by the usual throttle pedal 11. Under the action of cam 9 contact 8 may engage a contact 12 which may itself engage a further contact 13. Contacts 12 and 13 are respectively connected to the terminals of a resistor 14. Opening of the throttle over a first range of movement thus first results in the engagement of contacts 8 and 12, and then of contacts 12 and 13 shorting out resistor 14. A further cam 15 positioned by the throttle pedal actuates a normally-closed contact 16 connected to the terminals of resistor 4. It is arranged that in the travel of throttle pedal 11 contact 16 opens simultaneously with the closing of contacts 12 and 13.

Contact 13 is connected to a fixed contact 17 which with a further fixed contact 18 is associated with a moving changeover contact C2 of a relay C whose operating coil is shown at C/2. Contact C2 is connected to a fixed contact 19 which with a further fixed contact 21 is associated with a moving change-over contact G1 of a relay G whose operating coil is shown at G/2. Contact G1 is connected to one terminal of the energising winding 22 of a clutch (indicated at 23), which is preferably of the magnetic powder kind described in British Patent No. 649,553. The other terminal of winding 22 is earthed.

A battery 24 has its negative terminal earthed and its positive terminal connected to the battery terminal 25 of regulator and cut-out 6. Terminal 25 is connected through an ignition switch 26 to a supply line 27. Line 27 is connected through a resistor 28 to contact 18 and through a normally-closed contact C1 of relay C to contact 21. One terminal of the operating coil G/2 of relay G is connected to line 27, and the other terminal is connected to earth through a normally-closed contact 29 which is operated by a vehicle-speed governor 31. The governor is of the centrifugal type and is driven from the output shaft of the vehicle gear box (FIGURE 2). The actuating lever (shown in FIGURE 1) of the governor is pivoted at a point intermediate to its ends so that as the speed of the output shaft increases contact 29 tends to be opened. The governor opens contact 29 when the vehicle speed reaches a value such that with the throttle opened beyond the first range (mentioned earlier) full energisation of the clutch is required. One terminal of the operating coil C/2 of relay C is connected to line 27, and the other terminal is connected to earth through a normally-open switch contact 32. This is incorporated in an otherwise conventional manual gear shift mechanism in such a manner that when the usual gear lever 36 (FIGURE 2) is manipulated to change gear the contact is closed and remains closed until the changing operation is completed. A normally-closed contact G2 of relay G is connected in parallel with resistor 4.

Referring to FIGURE 2, the engine 34, clutch 23, and gear box 35 are mounted in their usual positions. The engine drives generator 1 through a belt 38. Gear lever 36 incorporates switch 32 in the knob. The take-off for the governor drive is indicated at 37. The cams 9 and 15 (FIGURE 1) are mounted on the throttle pedal shaft 39.

The manner in which the system operates starting from rest, will now be described. In FIGURE 1 all the contacts are shown in the "de-energised" or "rest" condition as the case may be.

(1) Ignition switch 26 is closed, energising line 27. Coil G/2 is energised, so that moving contact G1 engages contact 19 connecting winding 22 to contact 13. Contact G2 is opened.

(2) Engine started. Voltage, depending on engine speed, but rising rapidly with engine speed until the normal regulator action takes over, appears at the armature terminal and contact 8.

(3) Gear engaged.

(4) (a) Throttle pedal depressed to a limited extent so that it remains within the first range of movement. Contacts 8 and 12 are engaged so that the clutch is energised through resistor 14 to give a smooth take-off from rest. Contact 16 is closed so that resistor 4 is shorted out, and generator 1 consequently gives a normal output for battery charging purposes. (b) Throttle pedal depressed to a substantial extent so that it passes beyond the first range of movement. Contacts 8, 12 and 13 engage, connecting the clutch winding directly to contact 8. Contact 16 opens under the action of cam 15, inserting resistor 4 in the field circuit of generator 1. The modified generator output ensures that the clutch energisation is matched to the engine speed to provide a smooth take-off from rest. Battery charging is, however, consequently curtailed.

(5) In any case, when the vehicle speed reaches the value required for governor 31 to open contact 29, relay G is de-energised so that contact G1 engages contact 21 and contact G2 is closed. The clutch is then energised from line 27, and resistor 4 is shorted out to restore the field circuit of generator 1, and therefore battery charging, to their normal condition. Under condition 4(b) the period of time during which battery charging is curtailed is comparatively short because of the rapid acceleration of the vehicle.

(6) Changes of gear ratio. During changes of gear ratio switch contact 32 is closed, energising relay C. If governor contact 29 is open, the clutch is completely de-energised on account of contact C1 being opened. If contact 29 is closed (vehicle at rest or moving slowly), the clutch is only partially de-energised, a small current flowing through resistor 28 and contacts 18, C2, 19 and G1. This assists gear engagement because the gears are rotated while the gear lever is in its neutral position.

It will be seen that the system provides a smooth take off from rest regardless of throttle position, whilst ensuring that battery charging occurs normally should the vehicle be driven for a long period at a low speed with a small throttle opening.

FIGURE 3 shows a modification to the circuit of FIGURE 1 in which resistor 14 is provided with two intermediate tappings which are respectively connected to contacts 41 and 42 situated between contacts 12 and 13. It will be seen that as the throttle is opened over the first range of movement resistor 14 is gradually shorted out. By this means the clutch energization may be more accurately matched to throttle position over the first range of movement.

FIGURE 4 shows a modification in which contacts 13 and 16 are replaced respectively by a normally-closed contact X1 in parallel with resistor 14, and a normally-open contact X2 in parallel with resistor 4. Contacts X1 and X2 are actuated by a relay X having a winding X/2 (shown in FIGURE 4) energized from line 27 through a normally-closed contact 43. Contact 43 is opened by cam 15 when throttle pedal 11 reaches the end of its first range of movement from the closed position. Relay X is thus energized over the first range of movement so that the clutch is energized through resistor 14, and resistor 4 is shorted out. When throttle pedal 11 reaches the end of its first range of movement relay X is de-energized, simultaneously inserting resistor 4 in the generator field circuit, and shorting out resistor 14. In other respects this modification does not affect the working of the system.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A power transmission system for a motor vehicle comprising an electrically-energized clutch having an energizing winding, a generator driven by the engine of the vehicle and having armature and field windings, the armature voltage being dependent upon engine speed and current in the field winding, electric circuit elements connecting the armature winding in series with the clutch energizing winding, said elements comprising means to vary the clutch energizing current, a source of current for the field winding, further electric circuit elements connecting the said source to the field winding and comprising means to vary the field current, an engine throttle control member movable between a throttle-closed position and a throttle-open position and operatively linked to the means to vary the clutch energizing current and the means to vary the field current, the means to vary the clutch energizing current being actuated over a first opening range of movement of the control member to increase the clutch energizing current for a given armature voltage, and the means to vary the field current being actuated upon opening movement of the control member beyond the first range to decrease the field current for a given voltage of said source.

2. A power transmission system as claimed in claim 1 wherein the means to vary the clutch energizing current comprise first variable resistance means in series with the clutch energizing and armature windings, and operatively linked to the control member so that over the said first opening range of movement it is varied from a maximum to a minimum value.

3. A power transmission system as claimed in claim 2 wherein the said source of current for the field winding is the armature winding and the means to vary the field current comprise second variable resistance means connected in series with the field and armature windings, the second variable resistance means being operatively linked to the control member so that upon opening movement of the control member beyond the said first range it is varied from a minimum to a maximum value.

4. A power transmission system as claimed in claim 3 wherein the second variable resistance means comprise a first, fixed, resistor and a first, normally-closed, contact in parallel therewith, the first contact being opened upon opening movement of the control member beyond the first range.

5. A power transmission system as claimed in claim 3 wherein during opening movement of the control member the first variable resistance means attains its minimum value substantially simultaneously with the opening of the first contact.

6. A power transmission system as claimed in claim 3 comprising also means responsive to the speed of the vehicle to control the second variable resistance means so that, regardless of the position of the control member, the second variable resistance means has its minimum value whenever the vehicle speed exceeds a predetermined value.

7. A power transmission system as claimed in claim 5 comprising also a second, normally-open, contact in parallel with the first resistor, and means responsive to the speed of the vehicle to close the second contact whenever the vehicle speed exceeds a predetermined value.

8. A power transmission system as claimed in claim 5 wherein the first variable resistance means comprise a second, fixed, resistor and a third, normally-open, contact in parallel therewith, the third contact being closed at the termination of the first opening range of movement of the control member.

9. A power transmission system as claimed in claim 5 wherein the first variable resistance means comprise a plurality of fixed resistors in series, each having a normally-open contact in parallel therewith, the contacts being successively closed to short out the fixed resistors upon movement of the control member over the first opening range from the throttle-closed position, the last contact being closed at the termination of the first range of movement.

10. A power transmission system as claimed in claim 8 wherein the first and third contacts are actuated by cams positioned by the control member.

11. A power transmission system as claimed in claim 9 wherein the first contact and the contacts in parallel with the said plurality of fixed resistors in series are actuated by cams positioned by the control member.

12. A power transmission system as claimed in claim 8 wherein the first and third contacts are simultaneously actuated by a relay, energization of the relay being controlled by a switch operated by the control member so that the first contact is opened and the third contact closed at the termination of the first opening range of movement of the control member.

13. A power transmission system as claimed in claim 5 wherein the clutch is a magnetic powder clutch.

References Cited in the file of this patent

UNITED STATES PATENTS

| | | |
|---|---|---|
| 1,946,200 | Easter | Feb. 6, 1934 |
| 2,688,388 | Gill | Sept. 7, 1954 |
| 2,788,872 | Winther | Apr. 16, 1957 |
| 2,880,831 | Maurice et al. | Apr. 7, 1959 |